Patented Feb. 2, 1943

2,309,935

UNITED STATES PATENT OFFICE 2,309,935

PROCESS FOR BREAKING PETROLEUM EMULSIONS

Edwin E. Claytor, Long Beach, Calif., assignor to Petrolite Corporation, Ltd., Wilmington, Del., a corporation of Delaware No Drawing. Application June 19, 1941, Serial No. 398,815

8 Claims. (Cl. 252—338)

This invention relates to the resolution of petroleum emulsions.

The main object of my invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned is of significant value in removing impurities, particularly inorganic salts from pipe line oil.

The compounds or compositions of matter herein described, which are intended to be used as the demulsifier of my process, consist of a certain kind of salt derived from amines of the kind hereinafter described and alkylated naphthalene sulfonic acid in which there is at least one alkyl group substituted in the naphthalene nucleus, the said alkyl group or groups, in turn, being characterized by containing at least three carbon atoms and not more than ten carbon atoms. Said alkylated sulfonic acid can be described by the following formula $D(SO_3H)_n$, in which $n$ indicates any small whole numbers, such as 1, 2, or 3; but generally speaking, the monosulfonic acid would be employed, and for purposes of brevity, the formula $D.SO_3H$ will be used.

If sulfonic acid of the kind typified by the formula $D.SO_3H$ is neutralized with an amine, such salt may be indicated by the formula:

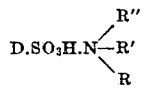

in which R, R' and R'' jointly represent the radicals which satisfy the nitrogen atom valency in a heat-polymerized basic hydroxy amine.

I have found that if alkylaryl sulfonic acids of the kind subsequently described in detail are neutralized with a heat-polymerized basic hydroxyamine of the kind hereinafter described, the resultant product has pronounced value as a demulsifier for oil field emulsions of the water-in-oil type, either when used alone or when used in conjunction with other compatible and well-known demulsifiers. Heat-polymerized basic hydroxyamines are well known compounds, and are described in detail, for example, in U. S. Patent No. 2,231,758, dated February 11, 1941, to De Groote, Keiser and Blair. For purposes of convenience, the subsequent description of such heat-polymerized basic hydroxyamine is substantially identical with that found in the aforementioned U. S. Patent No. 2,231,758.

It is well known that alkylol amines or similar basic hydroxyamines, i. e., amines characterized by the fact that there is no aryl radical directly attached to the amino nitrogen atom, can be polymerized by heating to elevated temperatures, particularly in the presence of suitable catalysts. Generally speaking, the catalysts are basic materials, or materials having a basic reaction, such as caustic soda, soap and the like. Polymerized amines contain two or more amino nitrogen atoms, but the most desirable form for my purpose is the form in which there are at least three nitrogen atoms present, and not more than five nitrogen atoms. Such amines may be polymerized to the degree that the material shows surface activity, when dissolved in water, either in the form of the amine (forming a base with water, of course), or in the form of a salt, such as the acetate. For the sake of convenience I will refer to the polymerized amines, broadly, as the polymerized product. I will refer to the form containing two nitrogen atoms as the dimeric form, and the type containing three, four or five nitrogen atoms, as the polymeric form. When sufficiently polymerized, the product will be surface active. This means that a dilute solution, as such, or in the form of the acetate (for instance, one tenth of 1% to 1%) will foam. I will refer to such type as the highly polymerized surface active form. In actual practice, the amine that is available most cheaply and which polymerizes most readily and which gives the most desirable type of demulsifier, is triethanolamine, particularly commercial triethanolamine, which, as is known, contains a small amount of monoethanolamine and an appreciable amount of diethanolamine. The composition of such polymerized amines is not definitely known, except that the polymerization takes place obviously by virtue of ether linkages. Examination of triethanolamine, for example, indicates that cyclic polymers could be formed or linear polymers could be formed, or polymers could be formed which involve both linear and cyclic formations.

Needless to say, since polymerization involves ether linkages, one may include a polyhydric alcohol, such as a glycol or glycerol, ricinoleyl alcohol, or one might includes polyhydric alcohols containing ether linkages, such as diethylene glycol, diglycerol, triglycerol, tetraglycerol, and the like. Monohydric alcohols, of course, can be employed only to form ether linkages with a terminal hydroxyl group. Thus, one mole of triethanolamine, for example, and three moles of ethyl alcohol might not form a highly polymerized material. The principle involved, of course, is readily understood, in view of the common theory of polyfunctionality in regard to resinous or subresinous materials derived from polyhydric alcohols and polybasic acids. To produce highly polymerized materials one must have reactants which are at least bifunctional. In polymerizations of the kind described the polyhydroxylated amines are bifunctional or polyfunctional intermolecularly. Monohydroxylated amines, such as ethanolamine, or a diethylethanolamine, are in the same class as monohydric alcohols, i. e., they are monofunctional, unless, as far as the material such as monoethanolamine is concerned, the hydrogen atoms attached to amino nitrogen atom could be removed with the formation of water, with the result that instead of an ether linkage, there is a direct carbon atom, nitrogen atom bond. Thus, in the claims reference will be made to the polymerization of polyfunctional alkylol amines, the intention being to emphasize this particular feature. As has been indicated, however, monofunctional compounds, such as monohydric alcohols, and certain monohydroxy amines are acceptable to form part of the polymerized compound or composition. Furthermore, polyhydric alcohols may be employed to produce the same polymeric structures as polyhydrated amines. The preferred type of compound, however, is prepared without the introduction of polyhydric alcohols such as glycerols, glycols, and the like. If desired, such particular type of preferred polymer may be indicated as being free from polyhydric alcohol residues, or more broadly, free from alcohol residues, the word "alcohol" being used in the sense to refer to non-amino bodies, i. e., the glycols and glycerols, and is not intended to refer to aminoalcohols, as the term is sometimes used in the description of triethanolamine or the like.

The polymerization of the basic hydroxy amines is effected by heating same at elevated temperatures, generally in the neighborhood of 200 to 270° C., preferably in the presence of catalysts, such as sodium hydroxide, potassium hydroxide, sodium ethylate, sodium glycerate, or catalysts of the kind commonly employed in the manufacture of superglycerinated fats and the like. The proportion of catalysts employed may vary from slightly less than one tenth of 1% in some instances, to slightly over 1% in other instances.

Needless to say, in the event the alcohol amine is low boiling, customary precautions must be taken so as not to lose part of the reactants. On the other hand, conditions must be such as to permit the removal of water formed during the process. At times the process can be conducted most readily by permitting part of the volatile constituents to distill, and subsequently subjecting the vapors to condensation. The condensed volatile distillate usually contains the water formed by etherization. Water can be separated from such condensed distillate by any suitable means, for instance, distilling with xylene, or removal of the water and subsequent removal of the xylene. The dried condensate is then returned to the reaction chamber for further use. In some instances, condensation can best be conducted in the presence of a high boiling solvent, which is permitted to distill in such a manner as to remove water of reaction. In any event, the speed of reaction and the character of the polymerized product depends not only upon the original reactants themselves, but also on the nature and amount of catalyst employed, on the temperature employed, time of reaction and speed of water removal, i. e., the effectiveness with which the water of reaction is removed from the combining mass. Polymerization can be effected without the use of catalysts in the majority of instances, but such procedure is generally undesirable, due to the fact that reaction takes a prolonged period of time and usually a significantly higher temperature. It is noted that in the subsequent examples the final compositions of matter which are contemplated, particularly for use as demulsifiers, are preferably derived by means of water-soluble polymerized hydroxy amines as one of the reactants. Thus, all the subsequent description of polymerized hydroxy amines has been limited largely to the type which is water-soluble, and is obviously the preferred type. However, it must be recognized that polymerized hydroxy amines, particularly if polymerized for a fairly long period of time, at a fairly high temperature, and in the presence of an active catalyst, may result in a polymerization reaction which ends in a product that is water-insoluble, or substantially water-insoluble. Obviously, such water-insoluble material can be obtained more readily from a higher hydroxy amine than from a lower one. In other words, tributanolamine, trihexanolamine, trioctanolamine, etc., would yield such insoluble products much more readily than triethanolamine.

Incidentally, it also must be recognized that the speed of reaction and the degree of polymerization is affected by the nature of the vessel in which the reaction takes place. In the examples cited, it is intended that reaction take place in a metal vessel, such as iron. However, in order to obtain the same degree of polymerization when conducting the reaction in a glass-lined vessel, it is quite likely that the period of reaction would have to be increased 150 to 400%.

Suitable hydroxy primary and secondary amines which may be employed to produce materials of the kind above described includes the following: diethanolamine, monoethanolamine, ethyl ethanolamine, methyl ethanolamine, propanolamine, dipropanolamine, propyl propanolamine, etc. Other examples include cyclohexanolamine, dicyclohexanolamine, cyclohexyl ethanolamine, cyclohexyl propanolamine, benzyl ethanolamine, benzyl propanolamine, pentanolamine, hexanolamine, octyl ethanolamine, octadecyl ethanolamine, cyclohexanol ethanolamine, etc.

Similarly, suitable hydroxy tertiary amines which may be employed include the following, triethanolamine, diethanolalkylamines, such as diethanol ethylamine, diethanol propylamine, etc. Other examples include diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzylethanolamine, benzyl dipropanolamine, tripentanolamine, trihexanolamine, ethyl hexyl ethanolamine, octadecyl diethanolamine, polyethanolamine, etc.

It is also known that one may have amines of the type:

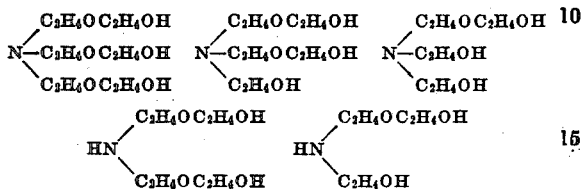

Such amines may serve as functional equivalents of the previously described amines.

Attention is directed to the fact that the alkylolamines are obtained in such a manner that they may be looked upon as being derivatives of dihydric alcohols or of the chlorhydrins of the dihydric alcohols. For example, the alkylolamines may be prepared as follows:

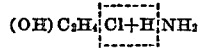

As previously stated, the $C_2H_4$ radical may be any one of a number of hydrocarbon radicals which are aliphatic, alicyclic, or aralkyl in nature.

It is at once manifest that similar derivatives are available from glycerols, polyglycerols, and the like, as indicated by the following reaction.

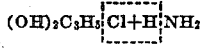

It is not necessary to point out that the same types of reactions will produce secondary or tertiary amines, and that the reaction is not limited to a combination with ammonia, but may take place with a combination of other primary or secondary amines, such as amylamine, diamylamine, cyclohexylamine, dicyclohexylamine, benzylamine, dibenzylamine, amyl cyclohexylamine, etc.

This means that in the types of material previously described, there is a wide variety of material, such as monoglycerylamine, diglycerylamine, monoglyceryl diethylamine, monoglyceryl dipropylamine, diglyceryl propylamine, triglycerylamine, etc., which are functional equivalents of the various amines previously described. All that has been said here in regard to functional equivalents will be perfectly obvious without further explanation to those skilled in the art. See U. S. Patent No. 2,091,704, dated August 31, 1937, to Duncan and McAllister, and also U. S. Patent No. 2,042,621, dated June 2, 1936, to Olin.

Attention is directed to co-pending application for patent Serial No. 273,221, filed May 12, 1939, by Melvin De Groote which has now matured into Patent No. 2,270,681, dated January 20, 1942. Said aforementioned application describes, among other things, the formation of hydroxy diamines, particularly certain hydroxylated methylene diamines by reactions involving an aldehyde, such as formaldehyde, and secondary amines, as, for example, diethanolamine. In such reaction the amino hydrogen atoms are removed along with the oxygen of the aldehyde, for instance, the oxygen atom of formaldehyde. The resultant product is tetraethanolmethylene diamine. Such hydroxylated amines, or comparable types, such as polyethylene diamines, may be employed in the same manner as the other hydroxylated amines of the kind previously described.

Attention is also directed to co-pending application for patent Serial No. 273,278, filed May 12, 1939, by Melvin De Groote and Bernhard Keiser which has now matured into Patent No. 2,293,494, dated August 18, 1942. Briefly stated, said co-pending application teaches, among other things, the formation of certain hydroxylated amines by means of an alcoholate derived, for example, from triethanolamine and a chlorhydrin, such as glycerin chlorhydrin, and the like. Examples of hydroxylated amines obtained by the procedure described in said aforementioned De Groote and Keiser application may be illustrated by the following examples:

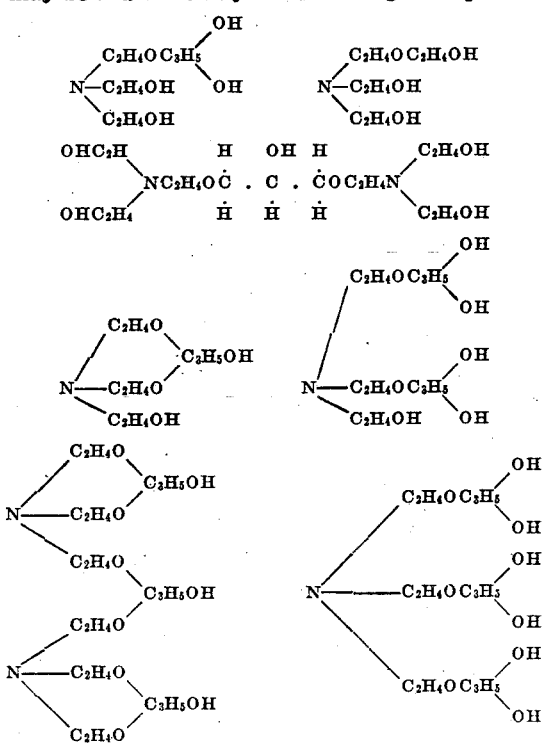

Attention is also directed to the fact that suitable amines includes tris(hydroxymethyl) aminomethane, and derivatives thereof, obtained in various manners, for instance, by reaction with chlorhydrins, alkyl chlorides, and the like, particularly ethylene glycol chlorhydrin, glyceryl monochlorhydrin, etc.

POLYMERIZED HYDROXYAMINE

*Example 1*

One percent of caustic soda is added to commercial triethanolamine and the product heated for approximately three hours at 245-260° C. The mass is stirred constantly, and any distillate is condensed and reserved for re-use after an intermediate running step. At the end of approximately two and one-half to three and one-half hours, the molecular weight determination shows that the material is largely dimeric.

POLYMERIZED HYDROXYAMINE

*Example 2*

The same procedure is employed as in the previous example, except that heating is continued for approximately another hour. In this instance the reaction mass is largely a polymeric material with an average molecular weight range indicating the presence of approximately three to four nitrogen atoms in the polymerized mass.

POLYMERIZED HYDROXYAMINE

*Example 3*

The same procedure is followed as in Example 2, except that a slightly higher temperature, approximately 10° higher, is employed, and a somewhat longer time of reaction, for instance, one-half to one and one-half hours longer. In any event, the reaction is continued until the product obtained either as such, or in the form of the acetate, dissolves in water (for instance, a solution varying in concentration from one tenth of 1% to 1%) and gives a foamy solution indicating high surface activity.

POLYMERIZED HYDROXYAMINE

*Example 4*

Tri-isopropanolamine is substituted for triethanolamine in Examples 1, 2 and 3.

POLYMERIZED HYDROXYAMINE

*Example 5*

Tripentanolamine is substituted for triethanolamine in Examples 1, 2 and 3.

POLYMERIZED HYDROXYAMINE

*Example 6*

Polyethanolamine of the following formula:

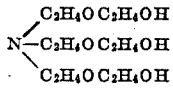

is substituted for triethanolamine in the previous examples.

POLYMERIZED HYDROXYAMINE

*Example 7*

Mixtures of the various amines previously described are made with glycerol in the proportion of two parts of hydroxyamine and one part of glycerol. One percent of caustic soda is added to the mixture and the same procedure employed as indicated in Examples 1, 2 and 3, although there may be some variation necessary to obtain the proper molecular weight range and surface activity. In any event, molecular weight determination can be employed, as well as a foam test of the kind previously described.

POLYMERIZED HYDROXYAMINE

*Example 8*

Diglycerylamine is substituted for triethanolamine, in Examples 1, 2 and 3, previously described.

As previously stated, the preferred polymerized hydroxy amines are water-soluble, but the water-insoluble type, or substantially water-insoluble type, of the kind previously referred to, may also be employed. Furthermore, it must be remembered that the final criterion of degree of polymerization, especially in the initial stages, is dependent upon an actual molecular weight determination, rather than based on time of reaction.

The manufacture of the demulsifier used in my process involves nothing more or less than neutralizing the selected alkylaryl sulfonic acid with a suitable polymerized amine, so as to neutralize the sulfonic hydrogen atom. As a rule, one can employ any suitable indicator, for instance, methyl orange, litmus, or any other suitable means of determining the neutralization point. For purposes of convenience, I prefer that the selected alkylaryl sulfonic acid contain not over 15% of water. It is, of course, understood that the conventional procedure employing double decomposition instead of direct neutralization, can be employed in the manufacture of my new material or composition of matter.

The amines above described may properly be referred to as basic, inasmuch as the basicity is in the neighborhood of that of ammonia. This is obvious, insofar that no amino hydrogen atom has been replaced by an aryl group, an acyl group, or any other group of the kind recognized as diminishing basicity.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily, perhaps, as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the particular salts used to produce the demulsifier employed in my process consists in converting the naphthalene into either the alpha or beta naphthalene sulfonic acid, or a mixture of the same, or in some instances, into a di- or even a trisulfonic acid, or a tetrasulfonic acid, or a mixture of the various types. In most instances there is no advantage in introducing more than one sulfonic acid residue. In many instances, it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as a propyl alcohol, a butyl alcohol, an amyl alcohol, a hexyl alcohol, a decyl alcohol, etc., is converted into the acid sulfate, such as propyl hydrogen sulfate. The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc., are carried out simultaneously. Generally speaking, the dialkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described, into the aromatic nucleus, one could also introduce an alkyl residue from some other alcohol, as, for example, an alkylated group derived from ethyl or methyl alcohol, or one might introduce a group derived from an aryl, aralkyl, cyclic, or hydroaromatic alcohol, or the like, but regardless of whether or not one introduces such other residues, it is necessary that at least one alkyl residue of the kind described, i. e., having at least three carbon atoms and not more than ten carbon atoms, be introduced into the naphthalene ring. Such compounds having some other group present, such as methyl group, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lower in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed as the demulsifier in the present process. For instance, although the sulfonic group may be introduced into either the alpha or beta position, it is manifest that the alkyl group or groups can be introduced into various positions in regard to the position of the sulfonic acid residue. Apparently, as far as I am aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and mixed amyl alcohols, it is my preference to produce my reagents from these alcohols, and in some instances, it is desirable to introduce different alkyl groups, such as a propyl group and butyl group, into the same sulfonaphthalene residue.

In the actual manufacture of alkylated naphthalene sulfonic acids, the composition of the desired chemical reaction is followed by a washing process which removes the excess of sulfuric acid or other sulfonation, sulfation, or condensation reagent employed. The acidic mass thus obtained is neutralized in any convenient manner with any suitable base, such as caustic soda, caustic potash, ammonium hydroxide, and the like. However, in accordance with what has been said herein, the acidic mass is neutralized with the amine of the kind previously described. The final product, if it represents a pasty or semi-solid or solid mass, is rendered suitable for industrial use by the addition of a solvent, such as water, and alcohol, a coal tar solvent, a petroleum hydrocarbon solvent, or the use of any other suitable solvent, such as a phenolic body, or a chlorinated hydrocarbon.

In manufacturing or producing the demulsifier above described, I prefer to obtain a chemical compound by reaction so conducted that three molecules of isopropyl alcohol are united with one molecule of naphthalene by the customary sulfation, sulfonation, and condensation reactions. The resulting mixture consists largely of di-isopropyl naphthalene sulfonic acids and tri-isopropyl naphthalene sulfonic acids, with possibly small amounts of mono-isopropyl sulfonic acids and tetra-propyl sulfonic acids present. Generally speaking, it is easier to conduct the reaction so that the bulk of the sulfonic acid represents the beta type, although the alpha type may be produced, if desired. The product is neutralized with a heat-polymerized basic hydroxyamine of the kind typified by examples of the kind previously described. The product so obtained is diluted with one or more solvents, so as to reduce its viscosity to that of ordinary castor oil, or slightly greater. The solvents which I preferably employ are a mixture of two or more of the following: Water, denatured alcohol, kerosene, or tar acid oil.

Among the reagents which are particularly effective are the salts formed by reaction between the amines of the kind previously described, particularly the amines of the kind exemplified by polymerized hydroxyamine Examples 1, 2 and 3 preceding, and the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl di-normal butyl naphthalene sulfonic acids, di-isopropyl di-normal butyl naphthalene sulfonic acids, di-isopropyl mono-amyl naphthalene sulfonic acids, mono-isopropyl mono-hexyl naphthalene sulfonic acids, etc.

In such instances where there is present more than one sulfonic acid radical, as in the formation of a di-sulfonic acid, or a tri-sulfonic acid, or a tetra-sulfonic acid, if desired, all the sulfonic radicals may be neutralized with amines of the kind previously described, or some of the sulfonic acid radicals may be neutralized with some other suitable base, such as sodium hydroxide, potassium hydroxide, ammonium hydroxide, etc., provided that at least one sulfonic acid radical has been neutralized by amines of the kind previously described.

Conventional demulsifying agents employed in the treatment of oil field emulsions are used as such, or after dilution with any suitable solvent, such as water, petroleum hydrocarbons, such as gasoline, kerosene, stove oil, coal tar products, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, complex amine type, the petroleum sulfonate type, the alkylated sulfoaromatic type, neutralized in the conventional manner, or even un-neutralized.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

It is to be noted that the increased effectiveness which the amine of the kind described permits or creates in the sulfonic acid does not appear in other comparable neutralizations of acidic demulsifying agents. Large varieties of materials which are acidic in nature have been suggested for demulsification, either in the acidic state, or after neutralization. The neutralization of many such materials, for instance, various sulfo derivatives obtained from other hydrocarbon sources, such as non-aryl raw materials, yields rather inferior demulsifying agents when neutralized with heat-polymerized basic hydroxyamines of the kind described. This is particularly true when such sulfo derivatives derived from non-aryl sources, for example, are compared with analogous sodium, potassium, and ammonium salts. Furthermore, the neutralization of alkylaryl sulfonic acids of the kind described herein with many amines results in a compound having a considerably decreased effectiveness, when used as a demulsifier. For instance, aniline, toluidine, dipropylamine, diamylamine, triamylamine, etc., cannot be substituted for the amines employed for neutralization in the preceding examples, without detracting markedly from the value of the compounds obtained. In other words, if the same alkylated naphthalene sulfonic acids which are employed to produce the chemical compound previously described happened to be neutralized with at least certain other amines, such as those referred to, one apparently does not obtain a reagent of any marked value, and especially a reagent of any superiority of effectiveness for demulsifying oil field emulsions. Similarly, the applicant has experimented with a number of other sulfonic acids, such as certain ones derived from petroleum, and found that neutralization with amines of the kind herein described does not give nearly as effective a reagent, in many instances, as conventional neutralization with caustic soda, caustic potash, ammonium hydroxide, and the like. Based on the results of actual tests obtained in a variety of emulsified crudes occurring in a number of the major oil fields of the United States, the conclusion one must inevitably reach is, that the product obtained by uniting the two different residues, i. e., the amine residue of the kind described and the sulfo-aromatic residue of the kind described into a single molecule, has an unlooked-for unique quality, which could not be foreseen by the present knowledge of the art and which produces a demulsifying agent that is particularly effective for a large number of emulsified crude oils.

In practising my process in regard to oil field emulsions, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Attention is directed to the fact that some of the polymerized hydroxyamines herein contemplated produce oil-soluble, water-insoluble salts when employed to neutralize various alkylaryl sulfonic acids of the kind herein described. This is particularly true in regard to those amines which are surface-active per se; i. e., the solution of the amine in water or in the form of a simple salt, such as the acetate, shows surface activity, as exemplified by producing, foaming, etc. Whether or not a water-insoluble salt is produced depends, in part, on the molecular weight of the sulfonic acid; and as has been previously indicated, this property may show variation. However, the surface-active, heat-polymerized hydroxyamines almost invariably produce a water-insoluble product, or at least a product with very limited water solubility, compared with the sulfonic acid prior to neutralization.

Having thus described my invention, what I claim as new and desire to secure by Letters Patent is:

1. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least three and not over 10 carbon atoms, and a heat-polymerized basic hydroxyamine.

2. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least 3 and not over 10 carbon atoms, and a non-acylated heat-polymerized basic hydroxyamine.

3. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least 3 and not over 10 carbon atoms, and a non-acylated heat-polymerized basic hydroxyamine free from an ether radical derived from a monohydric alcohol.

4. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least 3 and not over 10 carbon atoms, and a non-acylated heat-polymerized basic hydroxyamine free from an ether radical derived from an alcohol.

5. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least 3 and not over 10 carbon atoms, and a water-soluble non-acylated heat-polymerized basic hydroxyamine free from an ether radical derived from an alcohol.

6. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least 3 and not over 10 carbon atoms, and a water-soluble non-acylated heat-polymerized basic hydroxyamine of the dimeric type, free from an ether linkage derived from an alcohol.

7. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least 3 and not over 10 carbon atoms, and a water-soluble non-acylated heat-polymerized basic hydroxyamine of the polymeric type, free from an ether linkage derived from an alcohol.

8. A process for resolving petroleum emulsions of the water-in-oil type, characterized by subjecting the emulsion to the action of a demulsifier comprising a chemical compound consisting of the salt of a basic amine; said amine salt being obtained from an alkylated naphthalene sulfonic acid in which at least one alkyl group substituted in the naphthalene nucleus contains at least 3 and not over 10 carbon atoms, and a water-soluble non-acylated heat-polymerized basic hydroxyamine of the polymeric type, free from an ether linkage derived from an alcohol; and said heat polymerized amine being derived entirely from triethanolamine.

EDWIN E. CLAYTOR.